United States Patent

Scherrer et al.

[11] Patent Number: 5,995,522
[45] Date of Patent: Nov. 30, 1999

[54] PULSED OPTICAL PARAMETRIC OSCILLATOR

[75] Inventors: Bruno Scherrer, Juilly; Michel Lefebvre, Orsay, both of France

[73] Assignee: Office National D'Etudes Et de Recherches Aerospaxiales Conera, France

[21] Appl. No.: 09/012,624

[22] Filed: Jan. 23, 1998

[30] Foreign Application Priority Data

Jan. 24, 1997 [FR] France ..................................... 97 00774

[51] Int. Cl.$^6$ ........................................................ G02F 1/39
[52] U.S. Cl. .................. 372/21; 359/330; 372/97
[58] Field of Search .................... 359/326–332; 372/21, 22, 97

[56] References Cited

U.S. PATENT DOCUMENTS

| | | | |
|---|---|---|---|
| 3,617,936 | 11/1971 | Bjorkholm | 359/330 X |
| 3,628,182 | 12/1971 | Ashkin et al. | 331/96 |
| 3,922,561 | 11/1975 | Byer et al. | 359/328 |
| 5,033,057 | 7/1991 | Bosenberg et al. | 372/97 X |
| 5,195,104 | 3/1993 | Geiger et al. | 372/97 |
| 5,235,456 | 8/1993 | Guyer et al. | 359/330 |
| 5,619,517 | 4/1997 | Dixon | 372/21 |
| 5,663,973 | 9/1997 | Stamm et al. | 372/21 X |
| 5,754,333 | 5/1998 | Fulbert et al. | 359/330 |
| 5,854,802 | 12/1998 | Jin et al. | 372/22 |
| 5,892,614 | 4/1999 | Asaba | 359/330 |

FOREIGN PATENT DOCUMENTS

| | | | |
|---|---|---|---|
| 0 742 614 | 10/1996 | European Pat. Off. | H01S 3/06 |
| Wo 94 25896 | 4/1994 | WIPO | G02F 1/39 |

*Primary Examiner*—John D. Lee
*Attorney, Agent, or Firm*—Blakely Sokoloff Taylor & Zatman

[57] ABSTRACT

A pulsed optical parametric oscillator comprising a spectrally pure source for emitting pumping wave pulses, a non-linear crystal to which the pumping wave is applied, a resonant cavity for the complementary wave defined by two same-axis mirrors situated on opposite sides of the crystal, a cavity for the signal wave defined by two same-axis mirrors situated on opposite sides of the crystal, and means for adjusting the length of one or both cavities, wherein the oscillator is a monomode pulsed parametric oscillator and wherein one of the two mirrors for each cavity is situated between the two mirrors of the other cavity.

10 Claims, 5 Drawing Sheets

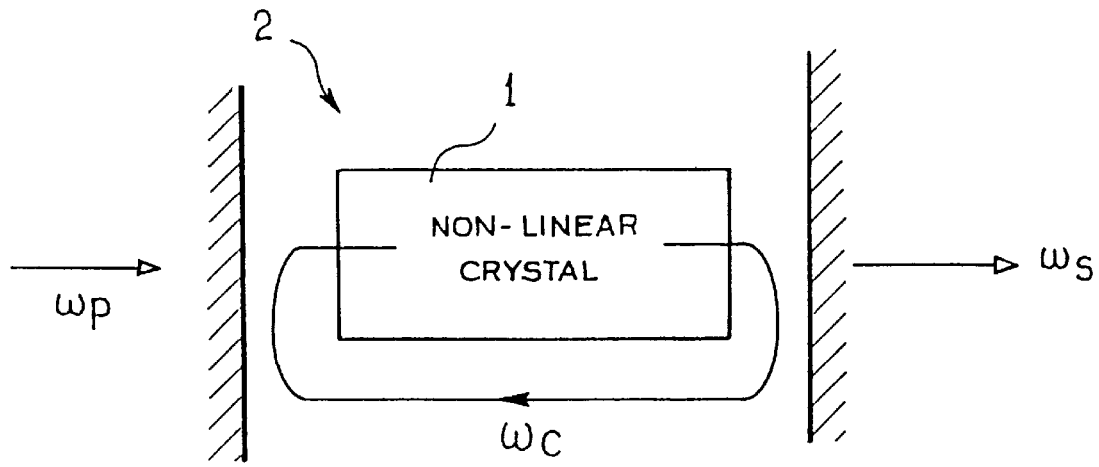
FIG_1
PRIOR ART
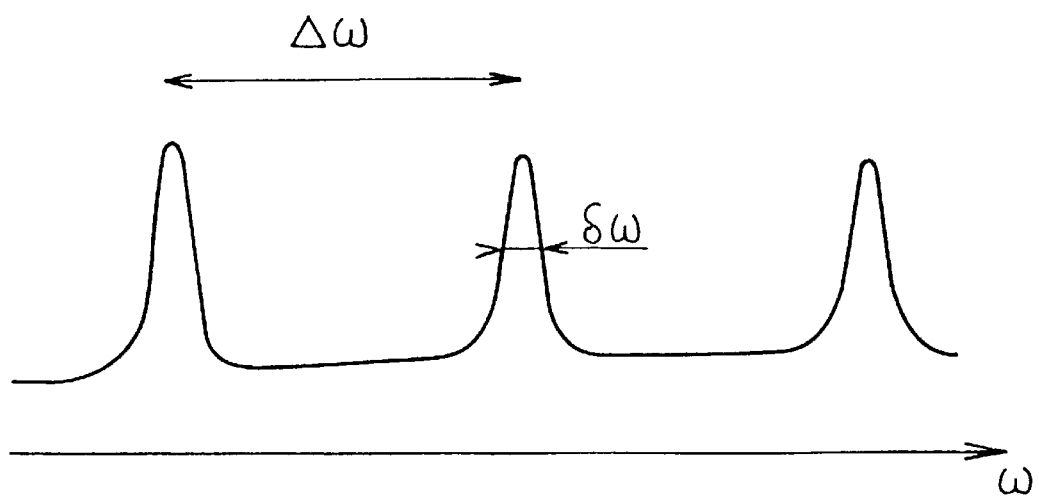
FIG_2

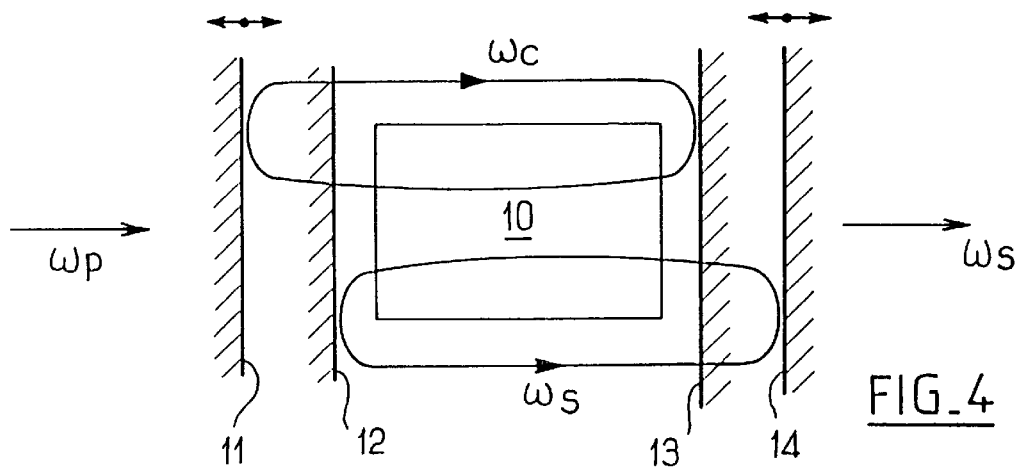
FIG_4
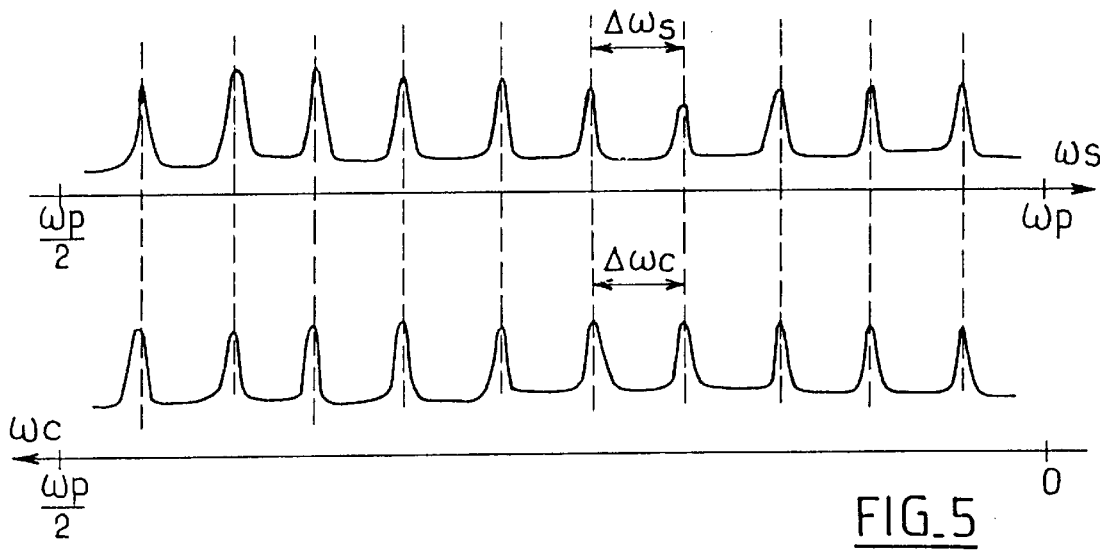
FIG_5
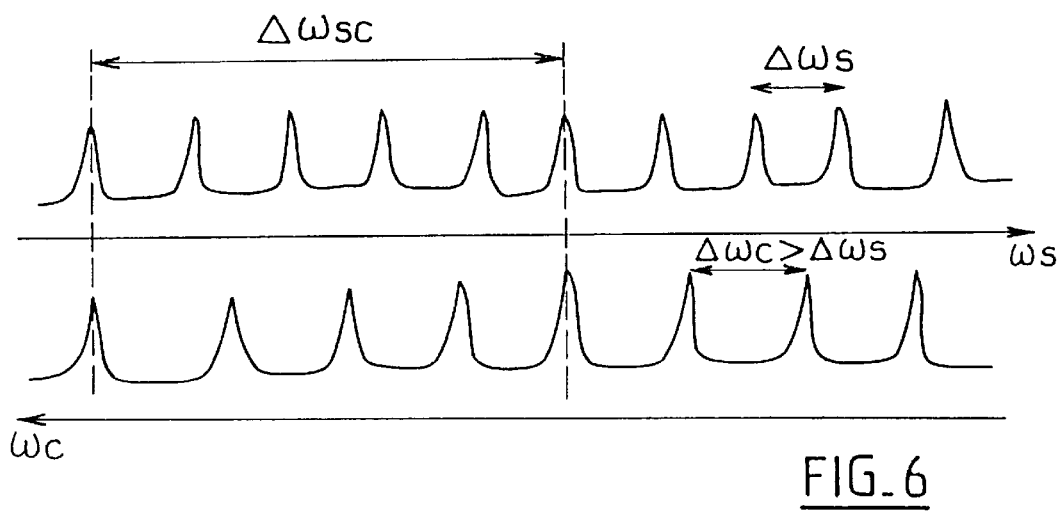
FIG_6

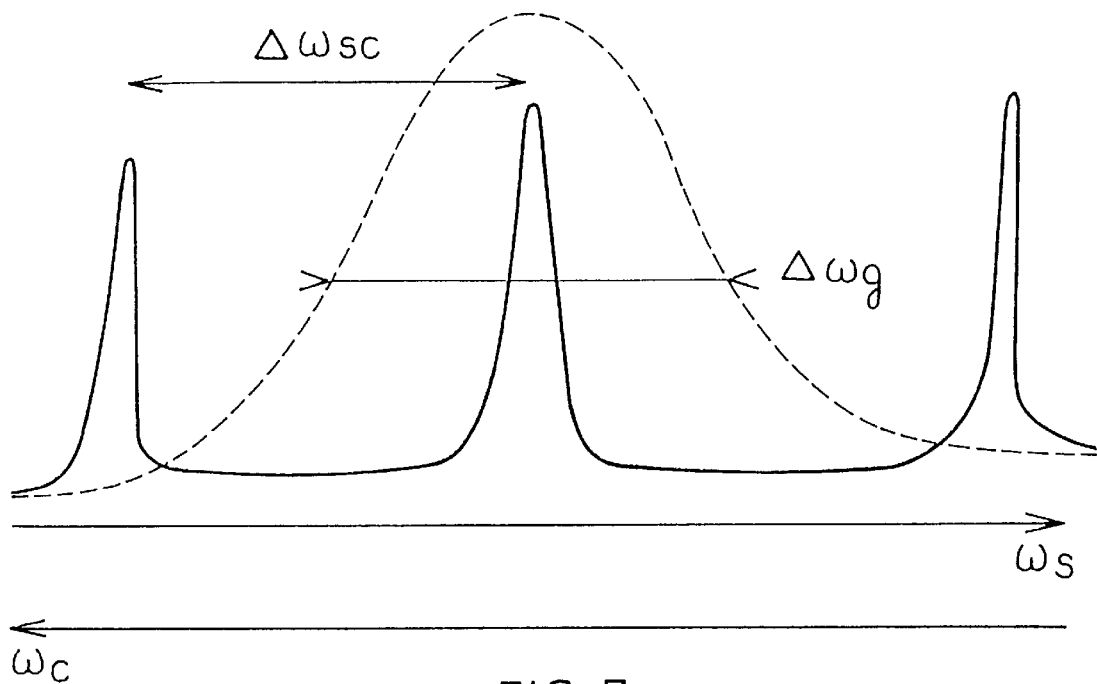
FIG_7
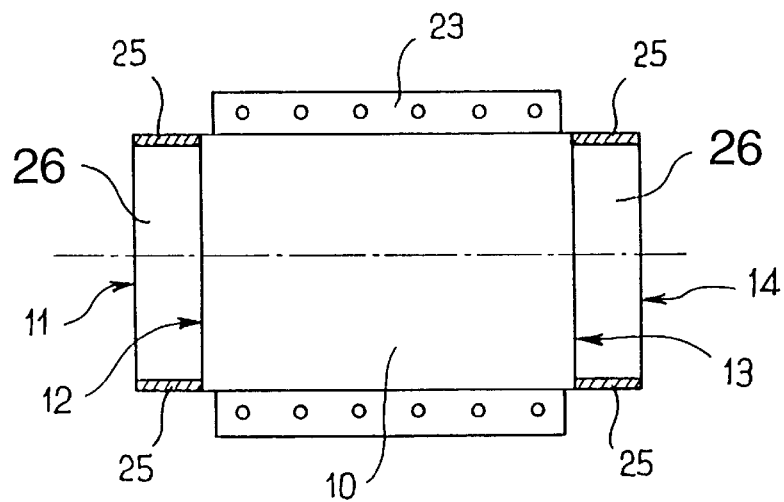
FIG_10

PULSED OPTICAL PARAMETRIC OSCILLATOR

TECHNICAL FIELD

The main characteristics of optical parametric oscillators (OPO) are recalled briefly below.

The process of parametric conversion consists in generating two coherent waves from a so-called "pumping" laser beam (frequency $\omega_p$), which coherent waves are respectively at a "signal" frequency ($\omega_s$) and at a "complementary" frequency ($\omega_c$) such that:

$$\omega_p = \omega_s + \omega_c \quad (1)$$

In an OPO, parametric conversion is performed, as shown in FIG. 1, in a second order non-linear crystal 1 which is placed inside an optical cavity 2.

In the simplest case, the cavity 2 is constituted by two parallel plane mirrors whose surfaces are treated to reflect one of the waves, e.g. the complementary wave, with the signal wave then being available outside the cavity; this configuration is said to be "simply resonant".

An OPO can also operate in a configuration that is said to be "doubly resonant", in which the mirrors are treated to reflect one of the waves completely and the other wave partially. These two arrangements differ, in particular, in their oscillation thresholds, where the threshold is conventionally defined as being the minimum pumping intensity that must be applied to the crystal to compensate for losses in the cavity. The doubly resonant arrangement makes it possible to obtain a lower oscillation threshold since that configuration makes it possible to reach a parametric amplification coefficient or "parametric gain" that is higher. In this context, parametric gain is defined as being the ratio of the intensity of the signal wave after one pass through the crystal over the intensity of the signal wave prior to passing through the crystal.

Depending on the birefringence properties of the crystal used, the frequency emitted by an OPO is generally tuned either by adjusting the orientation of the crystal relative to the direction of the optical beams (referred to as "angle-critical phase tuning") or by changing the temperature of the crystal ("non-critical phase tuning").

OPO operation under continuous conditions needs to be distinguished from operation obtained under pulsed conditions.

Under continuous conditions, i.e. when the pumping radiation applied to the crystal comes from a continuous laser, and is therefore of low power, parametric gain is low. In order to reach the oscillation threshold of the OPO, the configurations used generally have a doubly resonant cavity, with a crystal that is as long as possible, implementing one or more go-and-return trips of the pumping beam in the cavity (triply resonant operation).

It will be observed that in spite of those dispositions, in the case of a continuous OPO, the low value of the parametric gain enables oscillation to be established in the cavity at a single frequency only, which naturally leads to a pure spectrum being emitted.

For an example of a continuous OPO having a doubly resonant cavity, reference may advantageously be made to the following publication:

[1] "Continuous-wave, dual-cavity, doubly resonant, optical parametric oscillator", F. G. Colville, M. J. Padgett, M. H. Dunn, Appl. Phys. Lett., Vol. 64 (1994), p. 1490, which describes a configuration in which the complementary wave and the signal wave are separated by means of a separating plate and resonate in two distinct cavities.

That configuration has the advantage of making it possible to use low oscillation thresholds (pumping power of the order of 200 mW or higher).

It also makes it possible to tune the frequency emitted by the OPO continuously by acting on the lengths of the cavities.

Under pulsed conditions, the pumping intensity and thus the parametric gain are much higher. That is why a simply resonant cavity enables parametric oscillation to be achieved. Thus, in general, the problem of the oscillation threshold does not arise under pulsed conditions, whereas it is always present under continuous conditions. However, the radiation emitted by the OPO is never spectrally pure because the parametric gain is effective over a spectrum width that varies from a few tenths to a few nanometers, depending on the polarization conditions of the beams. The energy of the OPO is distributed in this spectrum width over several tens of resonant frequencies referred to as "longitudinal modes". The mode structure is associated with the cavity. The only waves capable of resonating are those which present a phase difference that is a multiple of $2\pi$ after performing a go-and-return trip.

Thus, as shown in FIG. 2, the modes are offset in frequency by the quantity:

$$\Delta\omega \times \pi c / L \quad (2)$$

where c is the speed of light and L is the optical length of the cavity. Each mode has a finite spectrum width ($\delta\omega$); in the simplest situation of a passive cavity, i.e. without an amplifying medium, the following applies:

$$\delta\omega = \Delta\omega / F \quad (3)$$

where F is the fineness of the cavity with fineness increasing with decreasing cavity losses.

For a more detailed description of the theory, reference may advantageously be made to:

[2] "Interféromètres à ondes multiples" [Multiple wave interferometers], Chapter VIII by G. Bruhat, Cours de Physique générale, optique 6ème édition [General physics course, Optics, 6th edition] (1992), p. 150.

STATE OF THE ART

From the above, it can be deduced that if a doubly resonant cavity OPO is used under pulsed conditions, then the radiation emitted depends on competition between the various combinations of modes at the signal frequency and at the complementary frequency. Thus, a priori, operation is particularly spectrally unstable.

[3] "Instabilities in the doubly resonant parametric oscillator: A theoretical analysis", J. Falk, IEEE Journal of Quantum Electronics, Vol. qE 7, No. 6, June 1971, pp. 230–235.

Unfortunately, in certain applications, it is necessary to have a pulsed OPO that emits on one mode only.

This "monomode" type of operation can be achieved either by reducing the width of the spectrum line emitted by the OPO by means of one or more selective elements placed in the cavity, or else by using an interferometer type of configuration.

Thus, at present, the three types of setup known for making monomode pulsed OPOs are setups having a simply resonant cavity having etalons, having a grating, or of the interferometer type.

For a description of setups with etalons, reference may advantageously be made to the following publications:

[4] "Single mode oscillation of a pulsed singly resonant optical parametric oscillator", L. B. Kreuzer, Appl. Phys. Lett., Vol. 15 (1969), p. 263;

[5] "Single-mode KTiOPO$_4$ optical parametric oscillator", F. Huisken, M. Kaloudis, J. Marquez, Yu. L. Churzavkov, H. S. Orlov, Yu. N. Polivanov, V. V. Smirnov, Opt. Lett., Vol. 20 (1995), p. 2306.

As shown diagrammatically in FIG. 3a, such a setup has one or more Fabry-Perot type etalons 3 of carefully chosen thickness.

The principle of a grating setup (Littman type cavity) is shown in FIG. 3b: one of the mirrors of the cavity is a rotating mirror 5. Spectral selectivity is provided by a grating 4 which disperses the complementary radiation towards said rotating mirror.

For an example of an implementation of a Littman type cavity, reference may advantageously be made to the following publication:

[6] "Single-frequency optical parametric oscillator", W. R. Bosenberg, D. R. Guyer, Appl. Phys. Lett., Vol. 61 (1992), p. 387.

Nevertheless, because the oscillation threshold is raised due to the losses introduced by the selective element, cavities having Fabry-Perot etalons or gratings are not entirely satisfactory.

In addition, the optical components constituting such selective elements have a relatively low damage threshold which means that they need to be protected from the pumping radiation, thereby increasing the complexity of the OPO and also its cost.

Also, the use of Fabry-Perot etalons makes wavelength tuning more difficult to control since it is necessary to adjust several parameters simultaneously: the length of the cavity, the orientation of the etalons, and the tuning of the center frequency of the OPO.

Doubtless interferometer cavities (or cavities of the Fox-Smith type) are those that present the lowest losses. They operate on the principle shown in FIG. 3c: the cavity is of a three-mirror configuration in which spectrum selectivity is obtained by adjusting the relative positions of two of the three mirrors in the cavity (the mirrors referenced 6 and 7 in FIG. 3c).

Nevertheless, in order to ensure operation that is perfectly monomode with pumping pulses of conventional duration (of the order of about 10 nanoseconds), implementing an OPO having an interferometer cavity requires a grating to be integrated therein, thus giving rise to the drawbacks described above.

For a description of OPOs having interferometer cavities, reference may advantageously be made to the following publications:

[7] "Interferometric stabilization of an optical parametric oscillator", J. Pinard, J. F. Young, Opt. Comm., Vol. 4 (1972), p. 425;

[8] "Highly efficient single-longitudinal-mode β-BaB$_2$O$_4$ optical parametric oscillator with a new cavity design", J. M. Boon-Engering, L. A. W. Gloster, W. E. Van Der Veer, I. T. McKinnie, T. A. King, W. Hogervorst, Opt. Lett., Vol. 20 (1995), p. 2087.

Proposals have already been made in patent application WO 94/25 896 for an optical parametric oscillator structure including a non-linear crystal to which a pumping wave is applied, and two cavities defined firstly by a common mirror disposed on one side of said crystal and secondly by two other mirrors disposed on the other side of said crystal.

That OPO structure is proposed and described mainly in the context of an optical parametric oscillator operating under continuous conditions, however it is also envisaged that the same structure could be used for pulsed optical parametric oscillators.

Nevertheless, with pulsed operation, that OPO structure is not entirely satisfactory if it is desired to obtain emission that is monomode.

In particular the thickness of the mirror remote from the source emitting the pumping wave and which is interposed between the non-linear crystal and the end mirror prevents the two cavities being given optical lengths that are similar unless special arrangements are used, and unfortunately it is necessary for the optical lengths to be similar if it is desired to obtain monomode operation under pulsed conditions.

Also, the use of a mirror that is common to both cavities prevents them being properly decoupled under high gain conditions as apply in pulsed operation.

In addition, with a monolithic implementation, that structure does not enable the length of one of the two cavities to be adjusted independently of the other.

OBJECT OF THE INVENTION

The invention proposes a pulsed OPO that enables those various drawbacks to be mitigated.

In particular, the pulsed OPO proposed by the invention enables stable monomode emission to be achieved without in any way requiring the use of dispersive elements or servo-control electronics.

In addition, its structure is compact, it is very flexible in adjustment, and its setup is mechanically simple.

In addition, the optical arrangements proposed by the invention is compatible with vertical or layered manufacturing methods that can be implemented collectively, thereby enabling manufacturing costs to be reduced.

More particularly, the invention provides a pulsed optical parametric oscillator comprising a spectrally pure source for emitting pumping wave pulses, a non-linear crystal to which the pumping wave is applied, a resonant cavity for the complementary wave defined by two same-axis mirrors situated on opposite sides of the crystal, a cavity for the signal wave defined by two same-axis mirrors situated on opposite sides of the crystal, and means for adjusting the length of one or both cavities, wherein the oscillator is monomode pulsed parametric oscillator and wherein one of the two mirrors for each cavity is situated between the two mirrors of the other cavity.

Such an oscillator makes it possible to adjust the optical lengths of the cavities so that only one pair of signal wave and complementary wave modes within the parametric gain width satisfies the equation:

$$\omega_p = \omega_s + \omega_c$$

where $\omega_s$, $\omega_p$, and $\omega_c$ are the frequencies of the signal wave, of the pumping wave, and of the complementary wave.

It will also be observed that the structure proposed by the invention makes it possible, as desired, to adjust the optical lengths of both cavities, with the possibilities of giving them optical lengths that are very close together, and of independently adjusting the optical length of each cavity.

The oscillator advantageously also has the various following characteristics taken singly or in any technically feasible combination:

the two inner mirrors are fixed relative to each other, at least one of the two outer mirrors being adjustable relative to the inner mirrors;

the inner mirrors are not parallel;

the means for adjusting the lengths of the two cavities are situated on opposite sides of the crystal;

the two inner mirrors are fixed relative to each other, the two outer mirrors being adjustable relative to the inner mirrors;

the inner mirrors are made by treating the faces of the crystal;

each of the means for adjusting the length of each cavity is disposed between the two mirrors situated on the same side of the crystal;

the means for adjusting the length of each cavity is made of a material of variable optical length;

the mirrors are made by applying treatment to the faces of the means for adjusting the length of each of the cavities; and the crystal and the means for adjusting the lengths of the cavities constitute a single block, thereby providing a source that is stable and robust and that requires no mechanical adjustment.

Other characteristics and advantages of the invention appear further from the description below which is purely illustrative and non-limiting.

BRIEF DESCRIPTION OF THE FIGURES

FIG. 1, described above, is a diagram showing a prior it simply resonant optical parametric oscillator;

FIG. 2 applies to a pulsed OPO and shows the distribution of modes in the cavity as a function of frequency;

FIG. 4 is a diagram of a pulsed OPO constituting one possible embodiment of the invention;

FIG. 5 is a diagram showing the superposition of the modes of the emitted signal and of the complementary signal for a doubly resonant pulsed OPO of the type known in the prior art, i.e. having a single cavity;

FIG. 6 is a diagram similar to FIG. 5 for a double cavity OPO constituting a possible embodiment of the invention;

FIG. 7 is a graph on which there are superposed an emitted signal mode and a complementary signal mode for a pulsed OPO constituting a possible embodiment of the invention; and FIGS. 8, 9, and 10 are diagrammatic sections of three OPOs constituting three possible embodiments of the invention.

DETAILED DESCRIPTION OF THE INVENTION

Figure 3A:
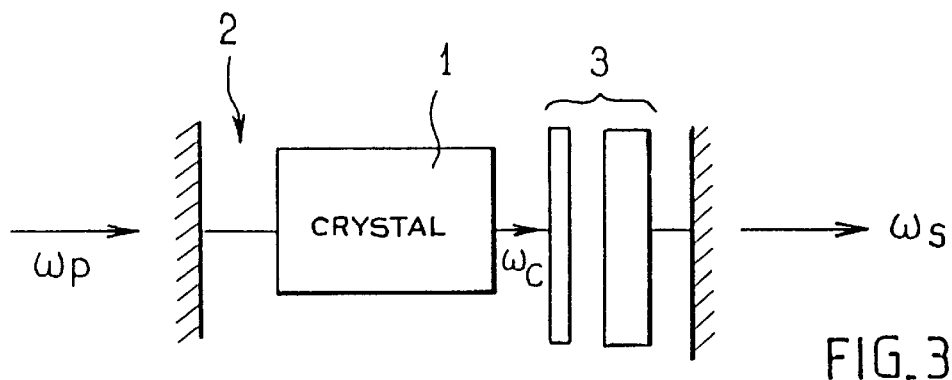
FIGS. 3a, 3b, and 3c are diagrams showing prior art pulsed OPO structures having spectrum selection.
Figure 3B:
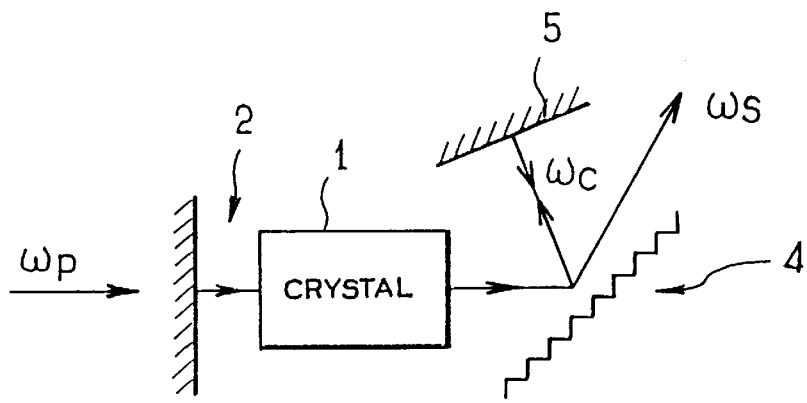
Figure 3C:
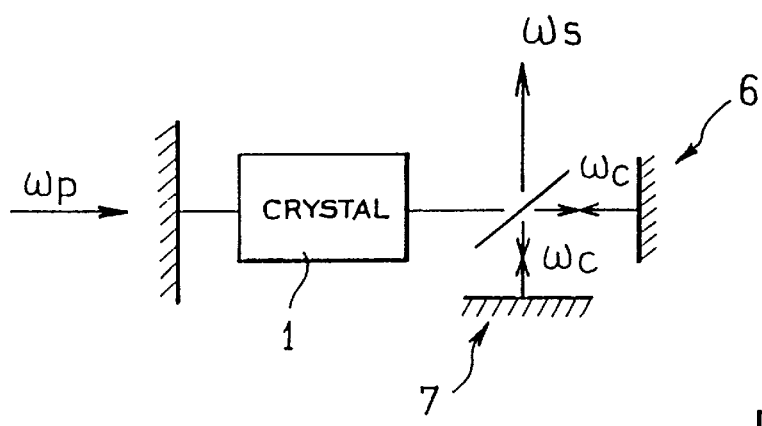

The optical parametric oscillator shown in FIG. 4 has a doubly resonant configuration defined by two cavities that are interleaved one in the other and that contain in their common portion a second order non-linear crystal 10.

One of the cavities is totally reflecting at the complementary wavelength (frequency $\omega_c$) the other being partially reflecting at the signal wavelength (frequency $\omega_s$). The coupling between the various waves is performed in the central portion of the OPO where the non-linear crystal provides parametric gain when the pumping wave ($\omega_p$) passes therethrough.

These two cavities are defined by four mirrors on a common axis, the two mirrors defining the cavity that is resonant at the complementary wavelength being referenced 11 and 13, and the other two mirrors being referenced 12 and 14.

These various mirrors 11 to 14 are transparent at the pumping wavelength (frequency $\omega_p$).

The mirrors 12 and 13 are inner mirrors and they are held fixed relative to each other.

The mirrors 11 and 14 are outer mirrors, the mirror 11 being that one of these two mirrors through which the pumping wave enters into the cavities, and the mirror 14 constituting the outlet mirror from the oscillator, and thus being semireflecting for this purpose so as to enable a portion of the signal beam $\omega_s$ to pass therethrough.

These outer mirrors 11 and 14 can be moved separately in translation relative to the mirrors 12 and 14 to adjust each cavity length.

The two cavities defined in this way can operate in a plane/plane configuration or in a plane/concave configuration (semi-confocal).

In the latter configuration, the mirrors 12 and 13 are selected to be plane, while the mirrors 11 and 14 are selected to be concave, with the radii of curvature of these mirrors optionally being different so as to provide good overlap within the crystal of the various beams.

This double cavity structure is better than any other configuration in obtaining signal and complementary geometrical cavity lengths that are simultaneously close to that of the crystal and that are separately adjustable.

The operation on which a pulsed OPO of the type shown in FIG. 4 operates is described below.

The emitted frequencies correspond to the case when all four following conditions are satisfied simultaneously:

for the signal wave, the frequency $\omega_s$ corresponds to a longitudinal mode of the signal cavity;

for the complementary wave, the frequency $\omega_c$ corresponds to a longitudinal mode of the complementary cavity;

each pair of modes satisfies equation (1); and only those frequencies situated in the gain width oscillate.

The frequencies $\omega_s$ and $\omega_p$ can be determined graphically by means of a diagram of a type shown in FIG. 5 for a prior art doubly resonant pulsed OPO, i.e. having a single cavity. Diagrams of this type, introduced by Giordmaine and Miller, are described, for example, in the following publication:

[9] "Mode selection in doubly resonant optical parametric oscillators", M. J. Padgett et al., IEEE Journal of Quantum Electronics, Vol. 30, No. 12, December 1994, p. 2979.

In such diagrams, the positions of the signal wave modes and of the complementary wave modes are plotted on two horizontal axes located one above the other, and they are plotted in opposite directions: on the first axis, the frequencies of the signal wave are plotted from left to right, increasing from $\omega_p/2$ to $\omega_p$; on the other axis, the frequencies of the complementary signal are plotted from left to right, decreasing from $\omega/2$ down to 0.

In this way, frequencies $\omega_s$ and $\omega_c$ that are situated on the same vertical are frequencies that satisfy the equations, $\omega_s + \omega_c = \omega_p$.

In the case of a single cavity doubly resonant OPO (FIG. 5 shows the prior art), the differences $\Delta\omega_s$ and $\Delta\omega_c$ between the mode frequencies of the output signal and of the complementary signal are very similar ($\Delta\omega_s \approx \Delta\omega_c$) In the cavity, the paths of the signal wave and of the complementary wave differ only by dispersion in the crystal. A large number of modes satisfy equation (1) and are therefore capable of oscillating, and as a result the radiation emitted by the OPO is multimode.

With the structure shown in FIG. 4, it is possible to adjust the relative positions of the mirrors 11 and 14 and to obtain cavities of lengths that are sufficiently different to avoid any overlap between adjacent pairs of modes. Under such circumstances, the permitted pairs of modes become very widely spaced apart (FIG. 6) and it can be shown (see Appendix I) that for signal and complementary cavities having the same fineness, the difference between these pairs, written $\Delta\omega_c$ depends on the optical lengths of the signal and complementary cavities, written $L_s$ and $L_c$ respectively, as given by the following relationship:

$$\Delta\omega_{sc} = F\pi c / \frac{1}{2}(L_s + L_c) \quad (4)$$

Expression (4) shows that the spacing between the resonances of the OPO proposed by the invention is F times greater than the spacing of modes in a simply resonant OPO of optical length equal to the mean of the optical lengths of the signal and complementary cavities.

Under such circumstances, monomode operation is obtained, as shown in FIG. 7 providing there is only one pair of modes $\omega_s$, $\omega_c$) satisfying equation (1) within the parametric gain width, which can be written as the following condition:

$$\Delta\omega_{sc} > \Delta\omega_g \quad (5)$$

where $\Delta\omega_g$ is the parametric gain width.

Parametric gain width is defined as being the spectrum range over which the gain exceeds the losses of the cavity.

Thus, for typical values of the fineness coefficient (10 to 20) and of spectrum line width (0.2 nm to 0.3 nm), monomode operation is obtained for cavities having mean lengths of centimeter order, with the lengths differing by about 10%.

The crystal 10 is then of small thickness (a few millimeters) giving rise to limited parametric amplification.

Nevertheless, the doubly resonant configuration makes it possible to ensure that there is sufficient gain to compensate for the short length of the crystal.

In addition, since as much as possible of the space between the mirrors is occupied by the crystal, parametric conversion is effective over the entire available length.

Thus, the OPO structure proposed by the invention is the optimum configuration for obtaining maximum gain with a short resonator having signal and complementary cavity lengths that are adjustable.

In addition, since the four mirrors 11 to 14 of the structure shown in FIG. 4 are in alignment on a common axis, the OPO is simple in structure and can be in the form of a single block, consequently making it very stable.

Figure 8:
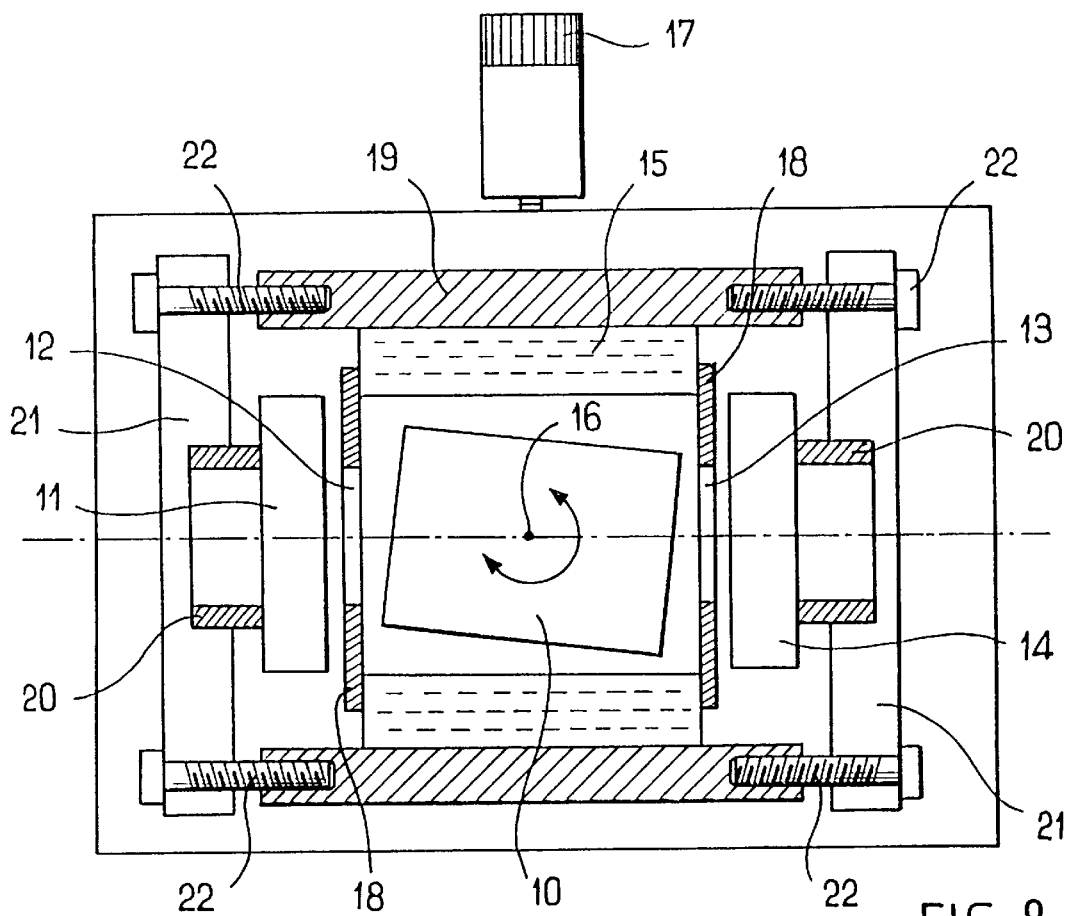

A detailed embodiment of the invention is shown in FIG. 8. In this embodiment, frequency is tuned by turning the crystal 10.

To this end, the crystal 10 is mounted in a zerodur cylinder 15 relative to which it is pivoted about a middle axis 16 perpendicular to the axis of said cylinder 15; its orientation can be adjusted by means of a turntable having high angular resolution (one thousandth of a degree) actuated by the operator using a screw 17.

The inner mirrors 12 and 13 are selected to be thin (1 mm thick) so as to minimize the internal length of the OPO. Given this small thickness, the diameter of each of these two mirrors 12 and 13 is restricted to 8 mm in order to ensure that their faces are properly plane.

The treatments applied to the mirrors 11 to 14 are selected to ensure the cavities are well decoupled.

The mirror 12 has a reflection coefficient that is greater than 95% at the signal wavelength lying in the range 570 nm and 620 nm, and its transmission is at a maximum at the complementary frequency (in the range 830 nm to 940 nm). Conversely, reflection and transmission of the mirror 13 are chosen to be at respective maxima at the complementary and signal wavelengths. To limit transmission losses, an antireflection treatment is applied to the rear face of each of the mirrors 11 to 14.

The mirrors 12 and 13 close the zerodur cylinder 15 at each of its ends, being held relative thereto by means of two flat annular rings 18 stuck to the edges of said cylinder 15. The connection between the mirrors 12 and 13 and the rings 18 is also provided by adhesive, using a flexible silicone glue to avoid any mechanical stresses on the inner mirrors.

The zerodur cylinder 15 is slightly prismatic (20 minutes of angle) so the mirrors 12 and 13 are not parallel, thereby avoiding possible interfering reflections.

The cylinder 15 is fitted inside an invar cylinder 19 of inside diameter corresponding to the outside diameter of the cylinder 15.

Because of their low coefficients of expansion, zerodur and invar make it possible to ensure good thermal stability for the cavity lengths.

The outer mirrors 11 and 14 are mounted on respective ends of the cylinder 19. Their dimensions are not as critical as th e dimensions of the mirrors 12 and 13.

The mirror 11, associat ed with the complementary cavity, has the same spectral characteristics as the mirror 13.

To enable working energy to be extracted, the mirror 14 reflects only 60% of the signal radiation (radiation at a wavelength lying in the range 570 nm to 620 nm), and its transmission is better than 95% in the range 830 nm to 940 nm.

The outer mirrors 11 and 14 are stuck on piezoelectric spacers 20 held to the ends of the invar cylinder 19 by two steerable plates 21.

The orientation of each mirror 11 and 14 is accurately adjusted by micrometer screws 22. The length of each cavity is finely adjusted using the piezoelectric spacers 20. It will be observed that the mirrors 11 and 14 can be steered and that the lengths of the cavities can be adjusted in the same manner by means of piezoelectric spacers disposed around the zerodur cylinder in order to achieve greatest compactness.

While the outer mirrors 11 and 14 are being put into place, the piezoelectric spacers 20 are placed so as to obtain an optical path length difference between the two cavities that is typically 10%. This is obtained by engaging the spacers 20 to a greater or lesser depth in the steerable plates 21.

By way of example, the crystal 10 is a crystal of β barium borate (BBO) operating in type II phase tuning ($\theta=40°$, $\phi=30°$), its section is 5 mm×6 mm, and its length is 6 mm. It is pumped by a frequency tripled monomode Nd:YAG laser, with the pumping wavelength thus being 355 nm. To cover the visible range 570 nm to 620 nm, the axis of the crystal is inclined at±4° relative to the normal incidence. This is made possible by placing the inner mirrors 12 and 13 at a distance of 0.5 mm from the faces of the crystal.

Figure 9:
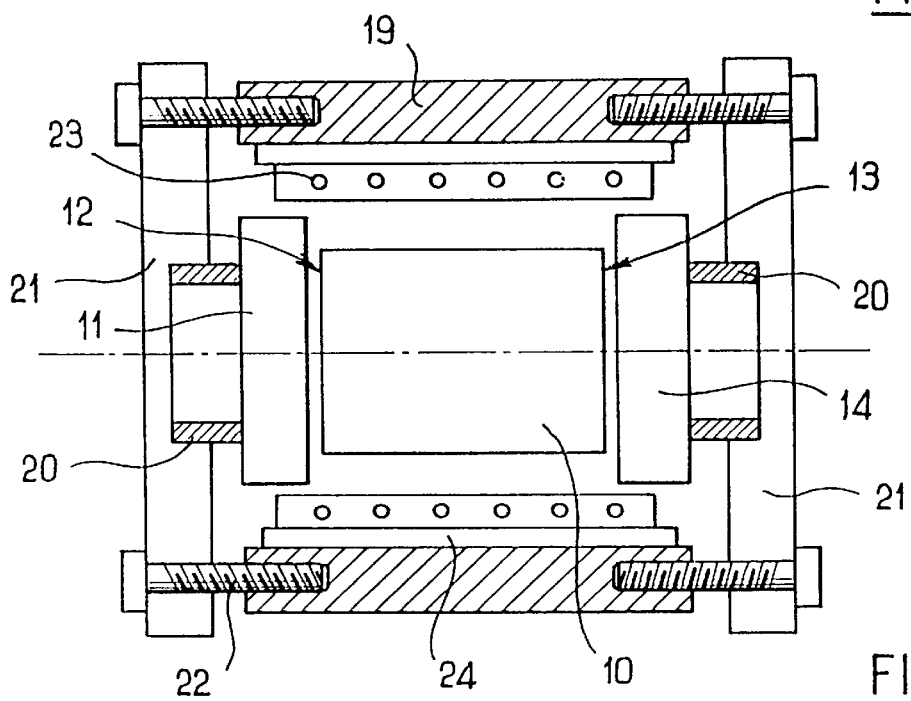

Another possible embodiment is shown in FIG. 9.

In this embodiment, wavelength tuning is obtained by adjusting the temperature of the crystal 10. For this purpose, the crystal 10 is placed in an oven enclosure 23. The enclosure 23 is cylindrical in shape and it is constituted by a shielded resistance winding of a type sold by the firm THERMOCOAX under the name "élément chauffant" [heater element]. The enclosure 23 is thermally insulated from the outside by a Teflon cylinder 24 and its temperature is regulated to within 100th of a degree centigrade. It should be observed that the cylindrical shape of the enclosure 23 ensures that the crystal is heated uniformly.

The enclosure 23 and the insulating cylinder 24 are mounted in an invar cylinder 19 similar to that of the variant shown in FIG. 8, with the mirrors 11 and 14 being mounted on the cylinder 19 via piezoelectric spacers 20, steerable plates 21, and micrometer screws 22.

In this second embodiment, the treatments for the mirrors 12 and 13 are applied directly to the faces of the non-linear crystal 10 which is slightly prismatic so as to avoid parasitic reflections. While still being separately adjustable, the lengths of the signal and complementary cavities are thus as short as in a simply resonant configuration. Consequently, the configuration is optimal for achieving monomode operation with minimum losses.

In a third embodiment, shown in FIG. 10, all mechanical adjustment is eliminated by placing two disks 26 of an electro-optical material such as lithium tantalate ($LiTaO_3$) directly on the faces of the crystal 10.

The optical length of each cavity is then varied by pplying an electric field via electrodes 25 disposed erpendicularly to the axis of the disks 26.

The thickness of each disk 26 is selected to cause the optical lengths of the signal and complementary cavities to differ, typically by 10%.

These disks 26 are held on the faces of the crystal using techniques known in the art in this field (molecular adhesion or gluing).

Parallelism between the mirrors 11 and 13 and between the mirrors 12 and 14 is obtained by polishing the faces of the crystal 10 and of the disks 26 prior to assembly.

The dielectric treatments for obtaining the mirrors 11 to 14 are performed on the faces of the crystal 10 and on the outer faces of the disks 26, or else they are performed directly on all of the faces of the disks 26, thus reducing the number of parts that need treatment to two.

After the crystal 10 and the disks 26 have been assembled together, the resulting single block parametric oscillator is disposed in a temperature-regulated oven enclosure 23.

The optical parametric oscillator obtained in this way can be juxtaposed at the outlet of a pumping microlaser so as to obtain maximum compactness. This provides a source that is entirely monolithic when using the manufacturing procedures described in document [10] EP 742 614.

Naturally, depending on the operating range desired for the OPO, other mirror treatments and other non-linear crystals can be used. For example, to cover the near infrared and the visible, it is advantageous to use the following non-organic crystals:

potassium titanium phosphate (KTP) and β barium borate (BBO) for the first embodiment; and potassium niobate ($KNbO_3$) and lithium tri borate (LBO) for the second and third embodiments.

With setups of the type shown in FIGS. 8, 9, and 10, the wavelength of the OPO is adjusted in two stages. In a first stage, a coarse first adjustment is performed by turning the crystal (FIG. 8 embodiment) or by adjusting the temperature of the oven (embodiments of FIGS. 9 and 10). Once the operating wavelength has been adjusted coarsely to the desired value, tuning is performed finely and continuously by changing the lengths of the cavities by means of the piezoelectric spacers 20 or the electro-optical disks 26 supporting the outer mirrors 11 and 14. In this way, the position of the resonant mode pair ($\omega_s$, $\omega_c$) is moved within the gain width, thereby changing the emitted frequency.

To tune wavelength continuously, the mirrors 11 and 14 are moved in the same direction at a ratio that depends on the optical lengths of the signal and complementary cavities ($L_s$, $L_c$) and on the emission frequency $\omega_s$. It can also be shown (see Appendix II) that there exists a range of use in which tuning can be obtained simply by moving the invar cylinder in translation relative to the internal portion of the OPO (in the first two embodiments).

As will have been understood, pulsed OPO structures of the types described with reference to FIGS. 8, 9, and 10 present numerous advantageous.

They are mechanically simple to implement.

They also make it possible to ensure that the source has good stability:

mechanically because the assembly is so compact (its outside dimensions are 20 mm in diameter and 50 mm in length in the first two embodiments), or because of the one-piece structure of the third embodiment; and thermally also, particularly because of the materials used; invar and zerodur.

These qualities lead to a reduction in manufacturing cost for a source that is monomode, stable in energy and in frequency, and that does not require a dispersive element or electronic servo-control of the cavity lengths.

APPENDIX I

SPACING OF THE RESONANCES OF THE OPO

PROPOSED BY THE INVENTION

Resonance spacing: for the case where $\Delta\omega_c > \Delta\omega_s$, $\Delta\omega_{sc}$ is given by the two equations:

$$\Delta\omega_{sc} = k\Delta\omega_c = (k+1)\Delta\omega_s \tag{AI.1}$$

where k is the number of signal cavity modes separating two successive coincidences at which $\omega_s$ and $\omega_c$ are simultaneously at resonance (see FIG. 6).

Equations (AI.1) lead to:

$$\Delta\omega_{sc} = \Delta\omega_s \Delta\omega_c / (\Delta\omega_s - \Delta\omega_c) \tag{AI.2}$$

$\Delta\omega_{sc}$ is thus at a maximum when ($\Delta\omega_s - \Delta\omega_c$) is at a minimum, and to avoid any overlap between two successive modes the following is applied:

$$\Delta\omega_s - \Delta\omega_c = \frac{1}{2}(\delta\omega_s + \delta\omega_c) \tag{AI.3}$$

Assuming that the signal and complementary cavities have the same fineness, then expression (AI.2) can be written as follows:

$$\Delta\omega_{sc} = 2F\Delta\omega_s\Delta\omega_c / (\Delta\omega_s + \Delta\omega_c) \tag{AI.4}$$

Given the expressions for $\Delta\omega_s$ and $\Delta\omega_c$ (equation (2)) the following applies:

$$\Delta\omega_{sc} = F\pi c / \frac{1}{2}(L_s + L_c) \tag{AI.5}$$

APPENDIX II

FREQUENCY TUNABILITY

To tune the frequency emitted by the OPO over a limited range, typically less than 1 nm, it suffices to change simultaneously the optical length of each cavity so as to maintain the frequency relationship:

$$\omega_s + \omega_c = \omega_p \tag{AII.1}$$

Variations in length are related to variations in frequency as follows:

$$\frac{\partial L_s}{L_s} = -\frac{\partial \omega_s}{\omega_s} \quad \text{(AII.2)}$$

and $$\frac{\partial L_c}{L_c} = \frac{\partial \omega_c}{\omega_c}$$

From expressions (AII.1) and (AII.2), the following is obtained:

$$\frac{\partial L_s}{\partial L_s} = -\frac{L_s \omega_s}{L_c \omega_s} \quad \text{(AII.3)}$$

This expression shows that if the optical lengths of the cavities are in the ratio of the signal and complementary frequencies, then it is possible to tune the frequency emitted by the OPO continuously by changing the length of each cavity by the same amount but in opposite directions. For the OPO proposed by the invention, this amounts to moving the mirrors 11 and 14 in translation in the same direction, i.e. in moving thee invar cylinder relative to the central portion (see FIGS. 8 and 9).

We claim:

1. A pulsed optical parametric oscillator comprising a spectrally pure source for emitting pumping wave pulses, a non-linear crystal to which the pumping wave is applied, a resonant cavity for the complementary wave defined by two same-axis mirrors situated on opposite sides of the crystal, a cavity for the signal wave defined by two same-axis mirrors situated on opposite sides of the crystal and means for adjusting the length of one or both cavities, wherein the oscillator is a monomode pulsed parametric oscillator and wherein one of the two mirrors for each cavity is situated between the two mirrors of the other cavity.

2. An oscillator according to claim 1, wherein the two inner mirrors are fixed relative to each other, at least one of the two outer mirrors being adjustable relative to the inner mirrors.

3. An oscillator according to claim 1, wherein the inner mirrors are not parallel.

4. An oscillator according to claim 1, wherein the means for adjusting the lengths of the two cavities are situated on opposite sides of the crystal.

5. An oscillator according to claim 4, wherein the two inner mirrors are fixed relative to each other, the two outer mirrors being adjustable relative to the inner mirrors.

6. An oscillator according to claim 5, wherein the inner mirrors are made by treating the faces of the crystal.

7. An oscillator according to claim 5, wherein each of the means for adjusting the length of each cavity is disposed between the two mirrors situated on the same side of the crystal.

8. An oscillator according to claim 7, wherein the means for adjusting the length of each cavity is made of a material of variable optical length.

9. An oscillator according to claim 8, wherein the mirrors are made by applying treatment to the faces of the means for adjusting the length of each of the cavities.

10. An oscillator according to claim 8, wherein the crystal and the means for adjusting the lengths of the cavities constitute a single block.

* * * * *

UNITED STATES PATENT AND TRADEMARK OFFICE
CERTIFICATE OF CORRECTION

PATENT NO.   : 5,995,522  
DATED        : November 30, 1999  
INVENTOR(S)  : Scherrer et al.

Page 1 of 3

It is certified that error appears in the above-identified patent and that said Letters Patent is hereby corrected as shown below:

On the title page, Item [73] delete "Aerospaxiales Conera" and insert -- Aérospatiales (ONERA) --.

Item [56], line 18, delete "Blakely Sokoloff Taylor & Zatman" and insert -- Blakely Sokoloff Taylor & Zafman --.

Column 2, line 25, delete

Column 2, line 35, delete " à ondes multiples" and insert -- à ondes multiples --.

UNITED STATES PATENT AND TRADEMARK OFFICE
CERTIFICATE OF CORRECTION

PATENT NO. : 5,995,522
DATED : November 30, 1999
INVENTOR(S) : Scherrer et al.

It is certified that error appears in the above-identified patent and that said Letters Patent is hereby corrected as shown below:

In column 2, line 37, delete "optique 6ème édition" and insert -- Optique 6ème édition -- .

In column 5, line 25, delete "a prior it" and insert -- a prior art -- .

In column 5, line 56, delete "crystal provides" and insert -- crystal 10 provides -- .

In column 6, line 52, delete "$\omega/2$" and insert -- $\omega_p/2$ -- .

In column 6, line 59, delete "$(\Delta\omega_s \approx \Delta\omega_c)$" and insert -- $(\Delta\omega_s \approx \Delta\omega_c)$. -- .

In column 7, line 7, delete "$\Delta\omega_c$" and insert -- $\Delta\omega_{sc}$ -- .

In column 8, line 24, delete "as th e dimensions" and insert -- as the dimensions -- .

In column 8, line 25, delete "associat ed with" and insert -- associated with -- .

UNITED STATES PATENT AND TRADEMARK OFFICE
CERTIFICATE OF CORRECTION

PATENT NO. : 5,995,522
DATED : November 30, 1999
INVENTOR(S) : Scherrer et al.

It is certified that error appears in the above-identified patent and that said Letters Patent is hereby corrected as shown below:

In column 8, line 54, delete "at$\pm$4°" and insert -- at $\pm$4° -- .

In column 9, line 18, delete "by pplying" and insert -- by applying -- .

In column 9, line 19, delete "disposed erpendicularly" and insert -- disposed perpendicularly -- .

Signed and Sealed this

Thirteenth Day of February, 2001

*Attest:*

NICHOLAS P. GODICI

*Attesting Officer*   Acting Director of the United States Patent and Trademark Office